INVENTOR.
THOMAS D. BAXTER
BY
Church & Church
ATTORNEY

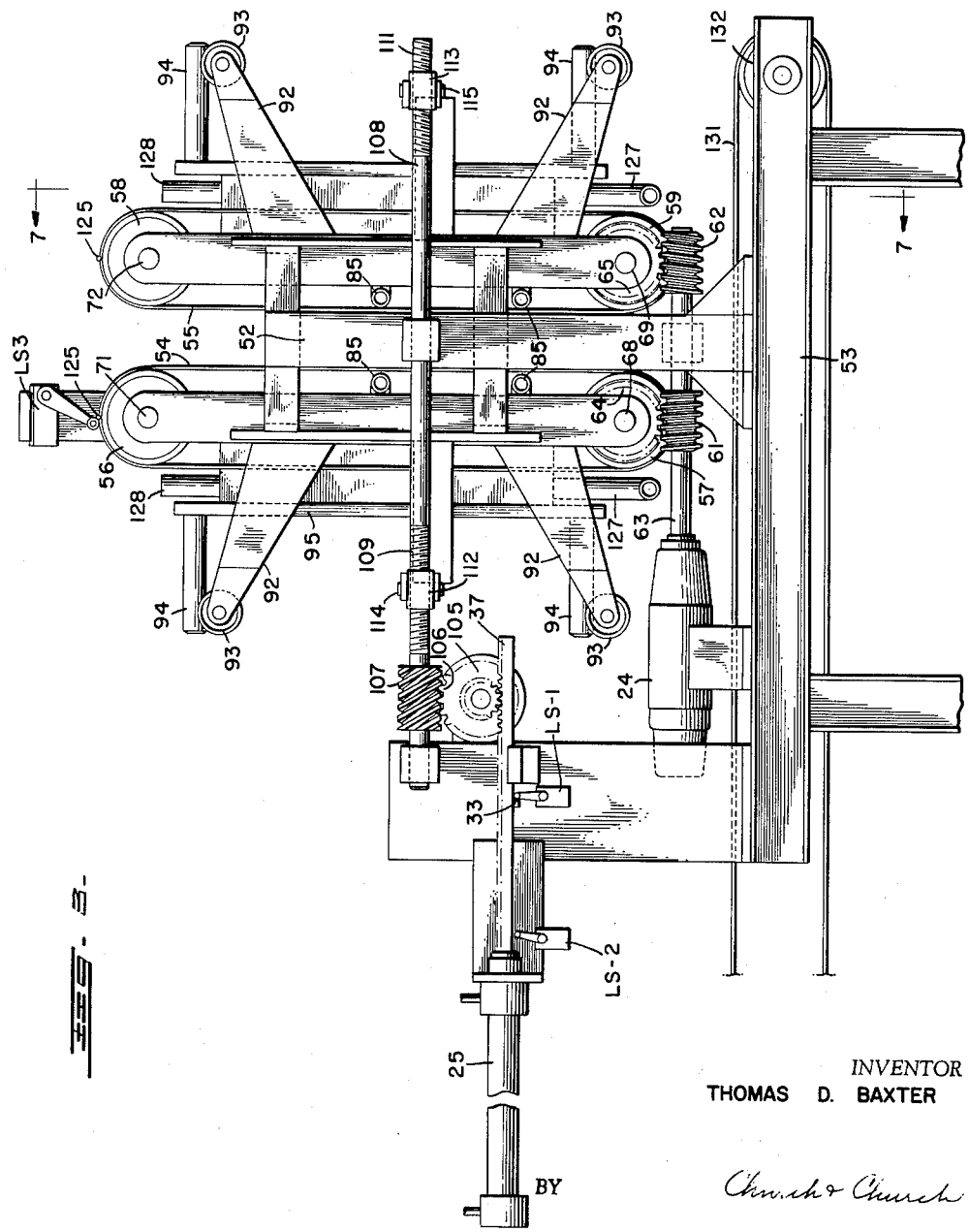

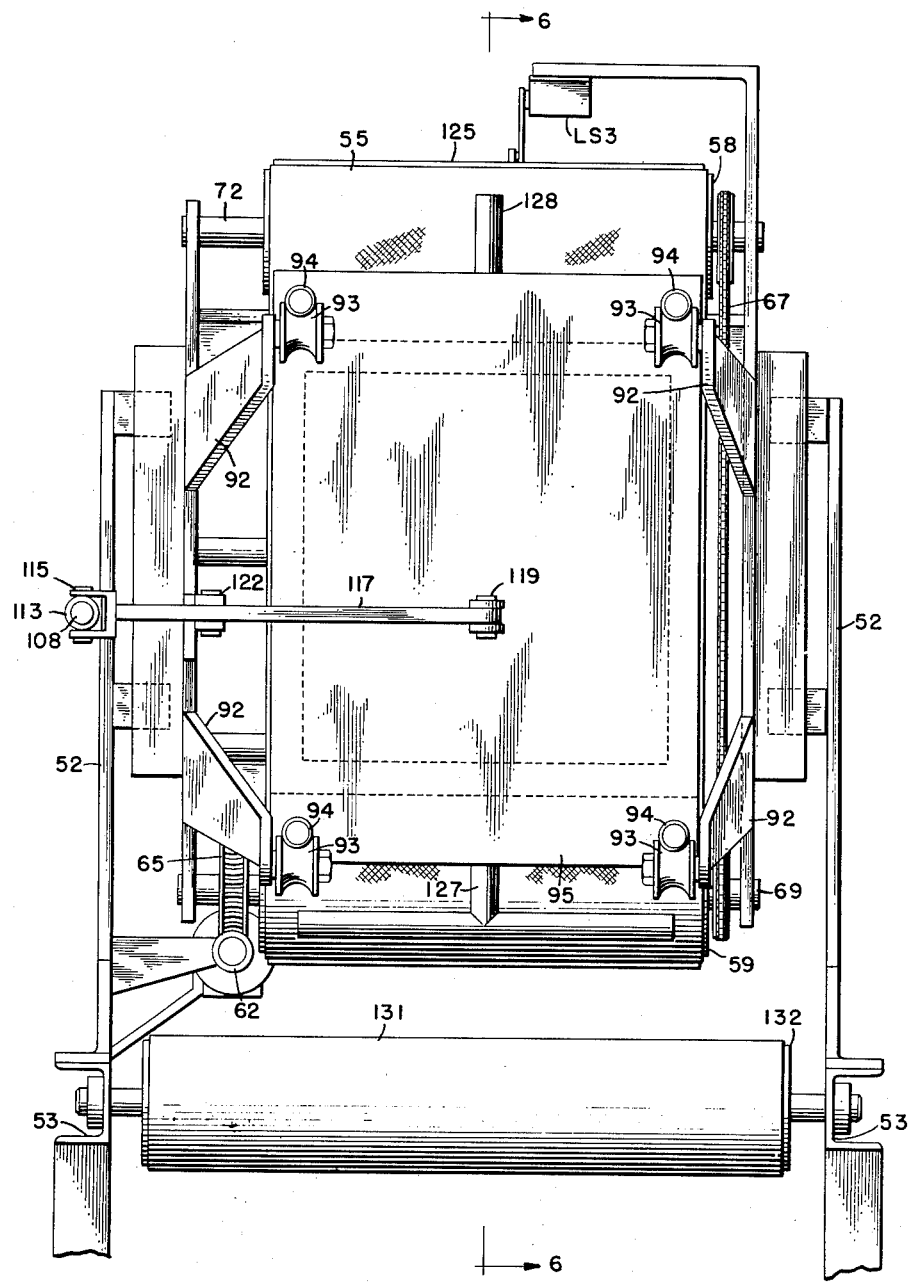

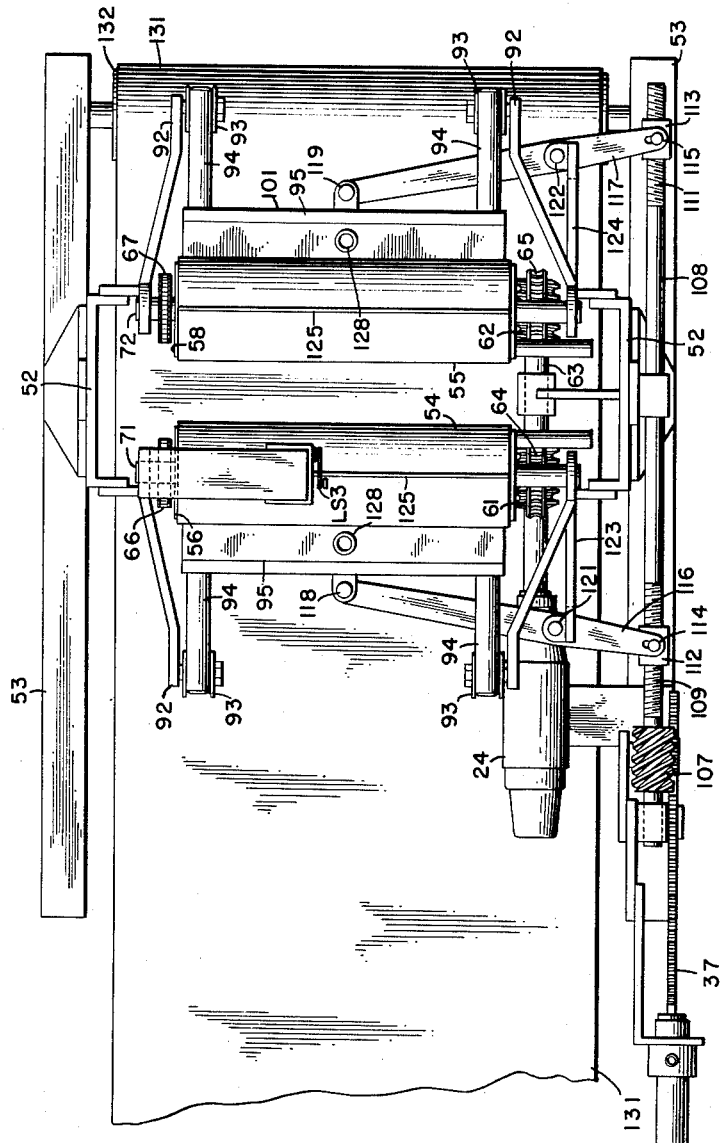

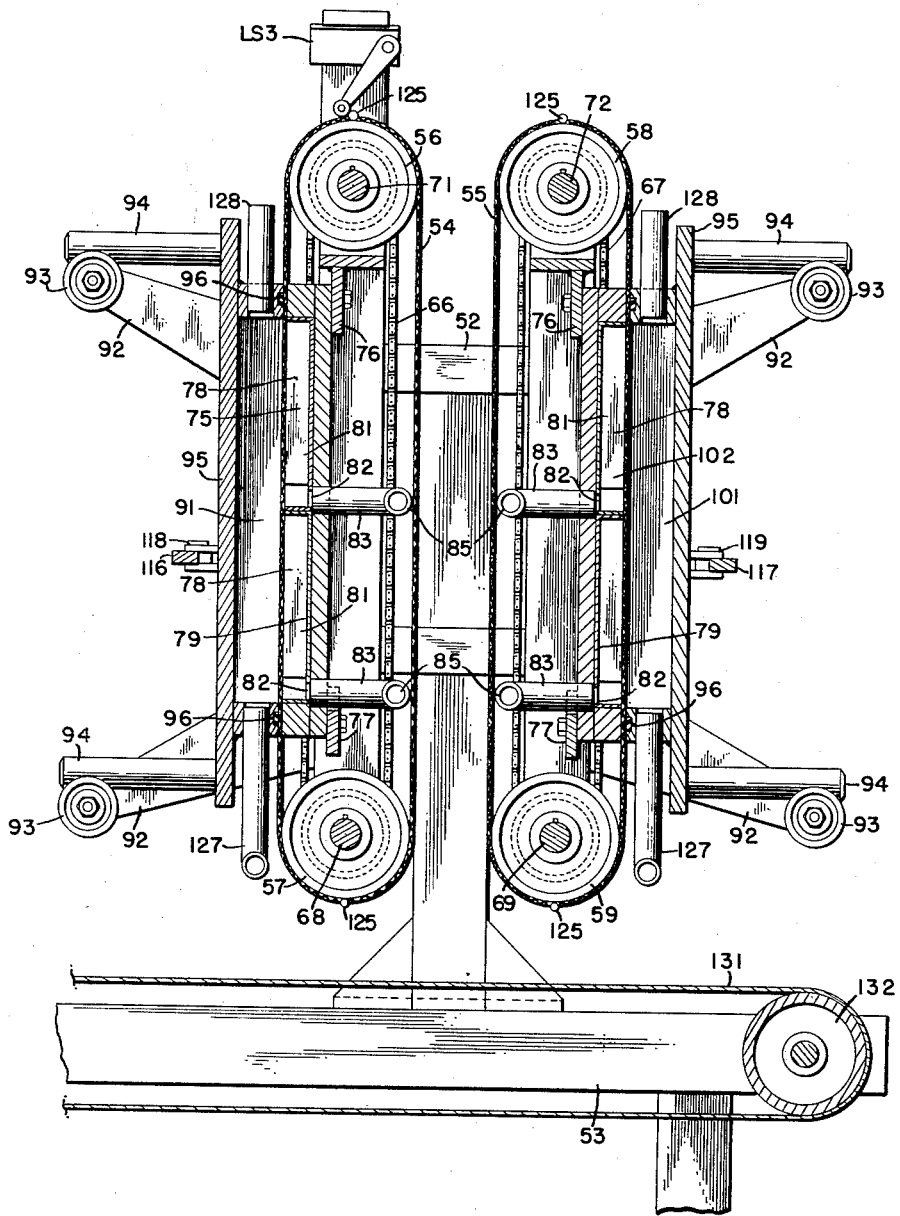

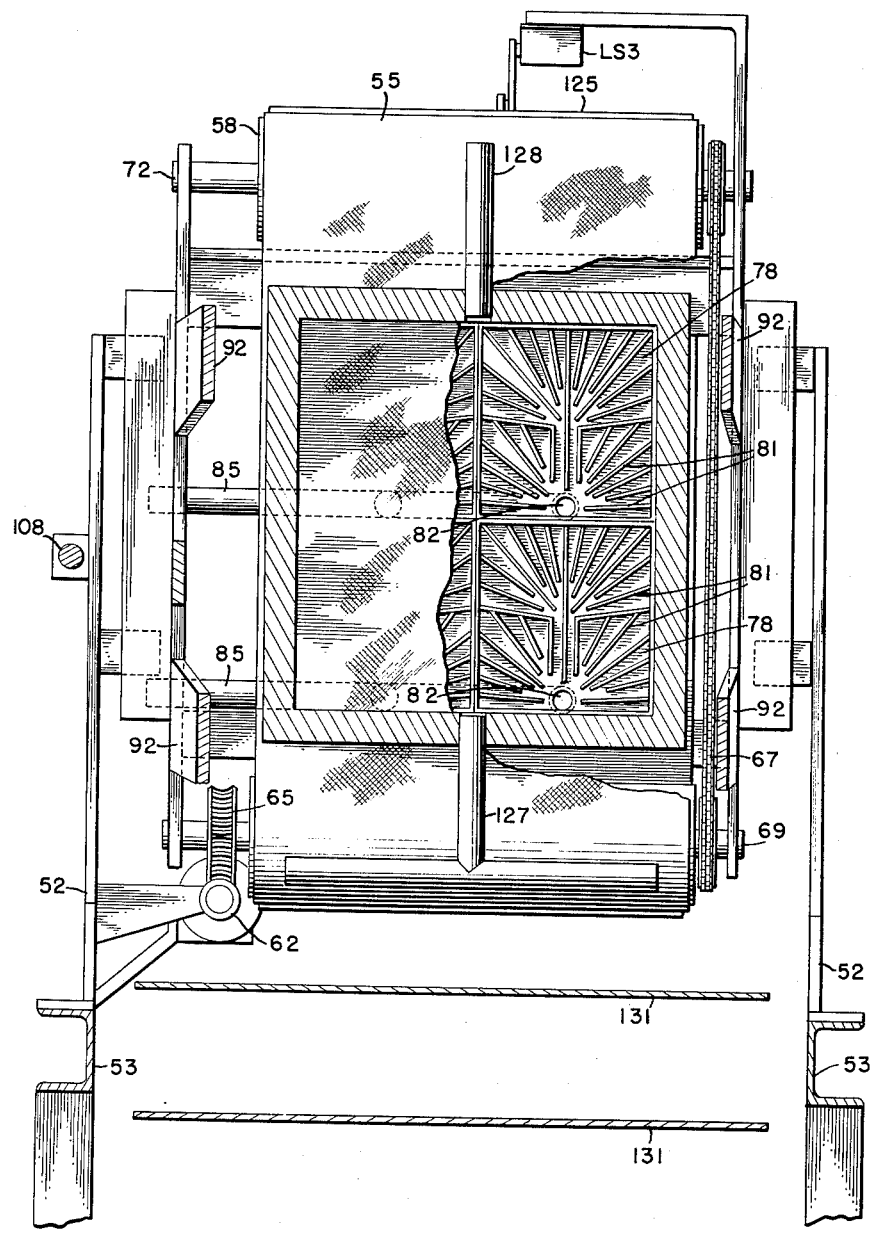

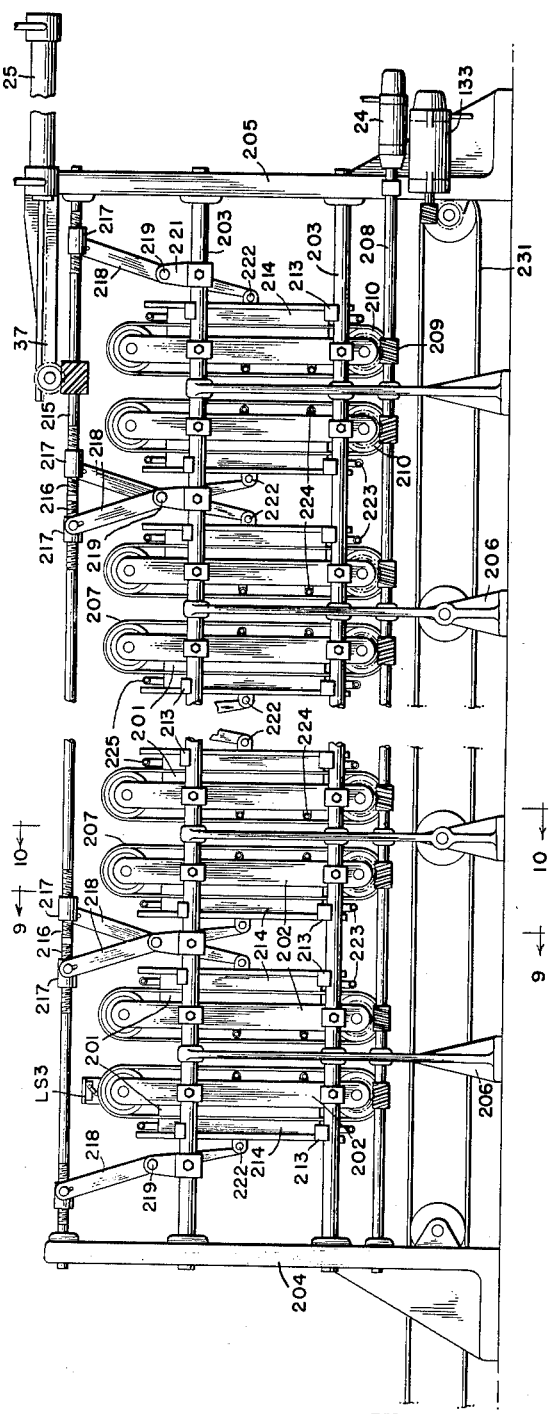

United States Patent Office 3,121,681
Patented Feb. 18, 1964

3,121,681
INDUSTRIAL FILTER
Thomas D. Baxter, East Petersburg, Pa., assignor to Baxter Filtration Corporation, Lancaster, Pa., a corporation of Pennsylvania
Filed July 6, 1956, Ser. No. 596,309
13 Claims. (Cl. 210—104)

This invention relates to industrial filters used in manufacturing processes to remove solids from slurries both for the purpose of further processing either the solids or the filtrate and for the purpose of disposing of waste.

Industrial filters used for these purposes are usually rated on the basis of the area of the filter medium, and since industrial filters are notorously inefficient on the basis of a low capacity per square foot of filter medium, the filters are traditionally large in size, occupying valuable space, and are both cumbersome and difficult to operate and maintain. This inefficiency is due to many factors including the large proportion of shut-down time necessary to clean the filters with the resultant tendency to delay the shut-down of the filters for cleaning purposes. Such delay results in the use of an inefficient portion of the filtering cycle, particularly when the filter cake becomes so thick as to seriously impair the flow of the slurry through the filter.

Use of pressure and vacuum to increase the filtration rate is satisfactory for only certain types of slurries, because compressible materials in most slurries compact as the cake builds up on the filter medium and are distorted to reduce the paths through which the filtered liquid may flow. Increased pressure does not materially increase the filtration rate after the layer of solids begins to form on the filter medium. Decrease in the rate of flow of liquid through the filter as the cake builds up on the filter medium is due to the increased thickness of the cake, the compression of solids, and also the migration of fines into the interstices of the filter medium. This combination of factors causes a continual and sharp decline in the rate of flow through the filter so the quantity of slurry filtered by a unit of area of filter medium within a unit of time decreases from the moment the filter is put in operation. After even a brief interval, the quantity of slurry filtered during a given period of time becomes quite low. Shut-down time to clean the cake from the filter medium in most pressure filters has heretofore been measured in terms of hours, and even the most recent developments have reduced cleaning time only to something of the magnitude of a half hour.

A major object of this invention is to provide a more efficient industrial filtering system having a much greater capacity per unit of area of filtering medium with resultant reduction in size to handle the loads in any situation.

An important object of the invention is to provide filtering apparatus in which a smaller proportion of a cycle is required for opening and cleaning the filter and a greater proportion of the cycle is allotted to forming the cake by processing material through the filter.

Another object of the invention is to provide filtering apparatus which performs efficiently for all types of slurries and compensates for the compressibility of different solids in the slurries and the effect of compression on the filtration rate.

A still further object of the invention is to provide filtering apparatus in which the migration of fines within the filter cake and into the interstices of the filter medium with resultant blinding of the filter medium is reduced to a minimum if not eliminated.

A still further object of the invention is to provide a filtering system in which any classification of fines in the slurry is avoided.

A still further object of the invention is to provide a filtration system of simplified construction to minimize maintenance and minimize requirements of stand-by equipment.

In the attainment of these objects, an important feature of the invention resides in the provision of automatic controls for the system to cycle periodically through a period of cake forming time and filter cleaning time together with improvements in the filter cleaning to reduce to a minimum that portion of the cycle required for cleaning.

Another feature of the invention resides in the control of the filter cycle to maintain as nearly as possible a high rate of flow of liquid through the filter for a given pressure and to automatically compensate and adjust the cycle to the compressibility factor of solids in the slurry and remove the filter cake at that stage of its formation where it begins to materially decrease the efficiency of filtration.

Another feature of the invention resides in the construction of the filter head which minimizes the time necessary to open the filter head and clean the filter medium by discharging the cake formed on the filter medium. In this connection the head includes two separable parts closing on opposite sides of an endless flexible filter cloth. A control mechanism is effective to open the parts, move the cloth to position a clean area between the parts, close the parts and discharge the cake from the cloth in a matter of a few seconds. Control of the operation of this head is determined by a decrease in the flow of liquid through the filter below a certain rate. A plurality of heads, each with an individual continuous filter cloth, may be arranged as necessary to be operated simultaneously as a unit, the number of heads being determined by the volume to be handled in each particular installation. Discharge of the filter cake from the filter cloth is automatic and the cake is conveyed away from the filter.

Other features and advantages of the invention will become apparent from the following specification taken in conjunction with the accompanying drawings, wherein:

FIG. 1 is a schematic flow diagram showing a filtration system embodying the invention in its preferred form;

FIGS. 2 and 2a constitute a schematic wiring diagram of the electrical controls for the system shown in FIG. 1;

FIG. 3 is a side elevation of a filter head which may be employed in the system shown in FIG. 1;

FIG. 4 is an end view of the filter head shown in FIG. 3 and is seen from the left hand side of FIG. 3;

FIG. 5 is a top plan view of the filter head shown in FIG. 3;

FIG. 6 is a longitudinal vertical section taken on the lines 6—6 of FIG. 4;

FIG. 7 is a vertical cross section taken on the lines 7—7 of FIG. 3;

FIG. 8 is a side elevation of a bank of filter heads with mechanism for operating them simultaneously;

Figure 1:
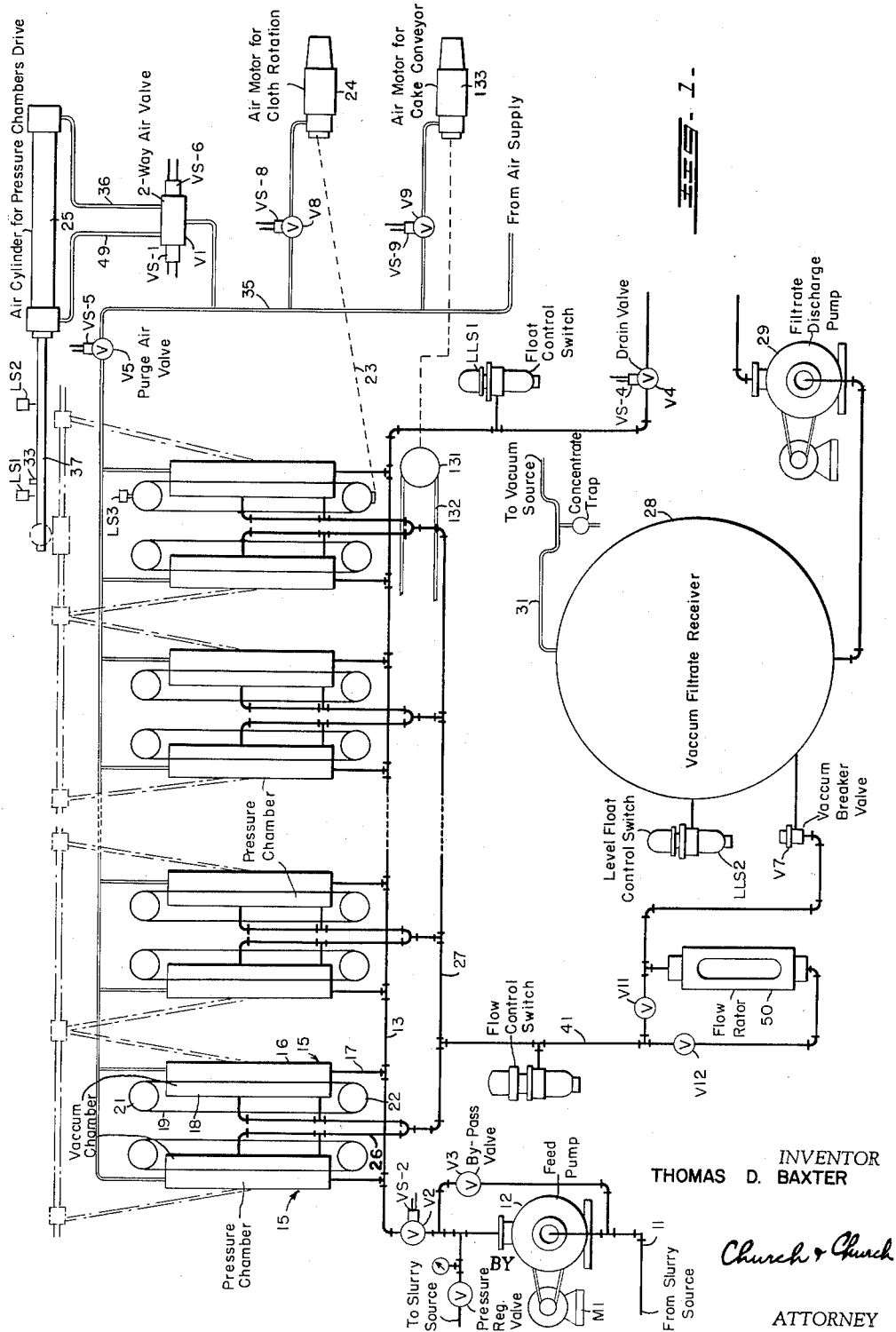

As shown in FIG. 1, a slurry to be filtered may be drawn from a suitable source through pipe 11 and supplied by a pump 12 to a manifold 13 and then to several filter heads designated generally at 15, each of which has a pressure chamber 16, to which slurry is supplied as through pipe 17, and a discharge member 18 which are separable and may be mechanically operated to open and close the filter heads in a manner subsequently to be described and by a mechanism represented schematically in FIG. 1 by dot-dash lines. Pressure chamber 16 and discharge chamber 18 close on opposite sides of one run of an endless flexible filter element 19 passing around rollers 21 and 22, one of which may be driven as by a shaft 23 from an air motor 24. Operation of the mechanism to open and close the filter heads is effected by an air cylinder 25 under the control of a two-way solenoid actuated valve V1. When the filter heads are closed and the slurry is fed into the pressure chamber, solids collect on the flexible filter elements 19, and the filtered liquid passes to the discharge member, then through outlet passage 26 to a discharge manifold 27, and into a filtrate receiver 28. It has been found advantageous to apply vacuum to the discharge manifold 27, and this is accomplished by connecting vacuum filtrate receiver 28 to a suitable vacuum source as through pipe 31 to maintain a predetermined level of liquid in filtrate receiver 28 by withdrawing liquid from that receiver through a filtrate discharge pump 29 under the control of a liquid level switch LLS2.

Figure 2:
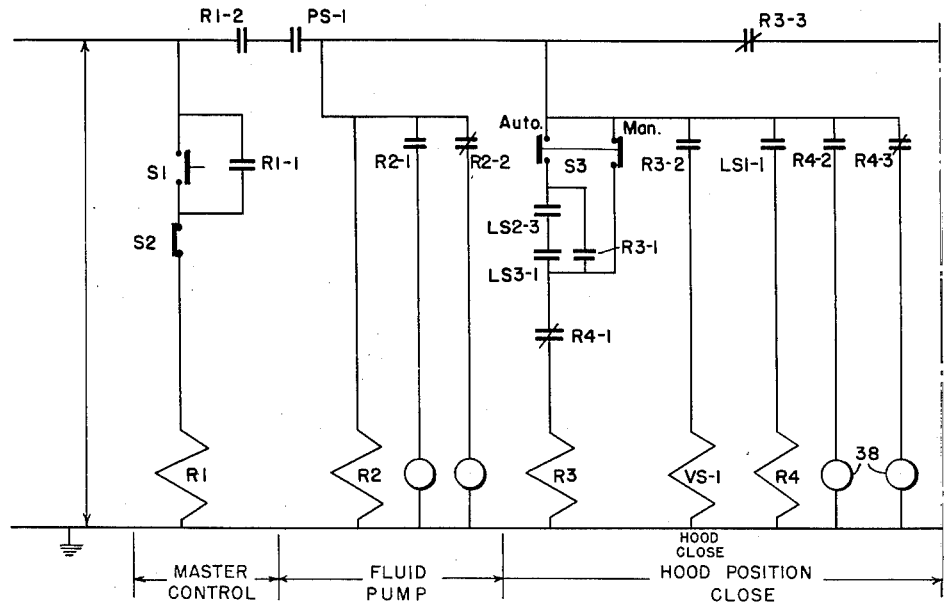

Automatic cyclic control of this filter system is effected electrically. The cycle is started by manually closing switch S1 (FIG. 2) to energize relay coil R1, thereby closing holding contacts R1–1 and cycle-initiating contacts R1–2. Assuming the filter heads are open so stop 33 on piston rod 37 is in engagement with limit switch LS2 to close contacts LS2–3 and a filter cloth has been positioned so one of the stops 125 (FIGS. 6 and 7) is in engagement with limit switch L3 to close contacts LS3–1, a circuit is completed through normally closed relay contacts R4–1 to energize relay coil R3. This closes relay contacts R3–2 to energize valve control solenoid VS–1 of the valve V1 and shift that valve to connect air from a supply pipe 35 through conduit 36 to the closed end of air cylinder 25 thereby moving the piston and piston rod 37 in a direction to close the filter heads through the mechanism represented in FIG. 1 by dot-dash lines and hereinafter more fully explained. Energization of relay coil R3 also opens normally closed contacts R3–3 to disconnect from the power supply the remainder of the system.

Figure 2A:
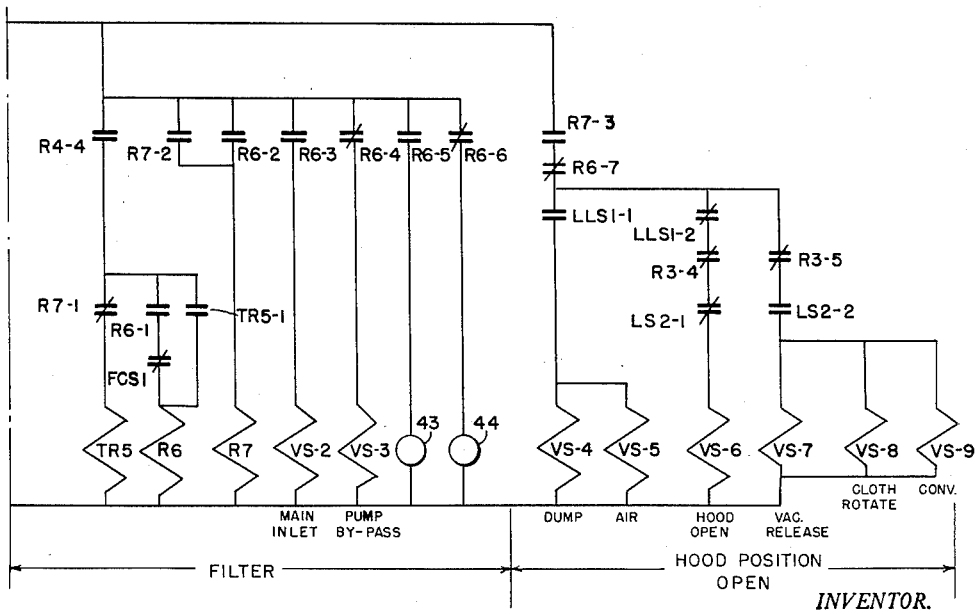
Figure 10:
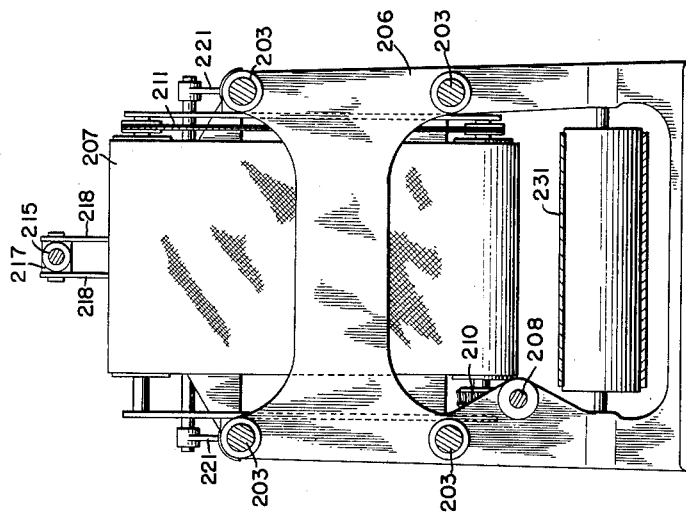
FIG. 10 is a vertical cross sectional view taken on the lines 10—10 of FIG. 8.
Figure 9:
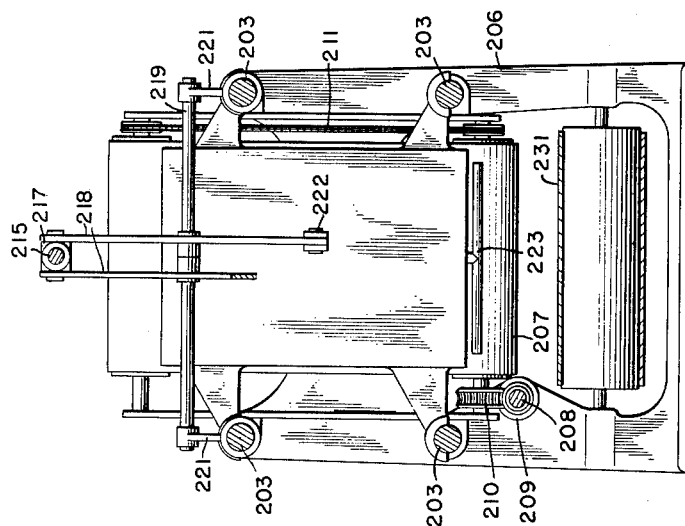
FIG. 9 is a vertical cross sectional view taken on the lines 9—9 of FIG. 8.

When the filter heads are closed, stop 33 on the piston rod 37 engages the striker of limit switch LS1 to close contacts LS1–1 and thereby energize relay coil R4 to open the normally closed contacts R4–1 in the circuit of relay R3. This deenergizes relay R3 and breaks the holding circuit through contacts R3–1. At the same time indicator lights 38, 38 are actuated by operation of relay contacts R4–2 and normally closed contacts R4–3. This deenergization of relay coil R3 to again close contacts R3–3 is effective to energize the coil of time delay relay TR5 (FIG. 2a), thereby opening normally closed contacts R7–1 and closing contacts TR5–1 of the time delay relay TR5 to energize relay coil R6. Energization of relay coil R6 closes holding contacts R6–1 and contacts R6–2 to energize relay coil R7 which is effective through its contacts R7–2 to hold the relay R7 energized until a cycle is completed and relay R3 is again energized to open normally closed contacts R3–3. Energization of relay R6 also closes its contacts R6–3 to energize main inlet valve to solenoid VS–2 to open the main feed valve V2 and supply the slurry to be filtered through the inlet manifold 13 to the respective pressure chamber 16.

Passage of the slurry into the filter heads immediately initiates the cake forming period of the cycle, and filtered liquid passes through the outlet passages 26 and discharge manifold 27 by flow control switch FCS and into the filtrate receiver 28. Contacts TR5–1 of time delay relay TR5 remain closed even though the coil TR5 is deenergized. The time is set so the contacts TR5–1 remain closed until the liquid discharged from the filter heads exceeds a predetermined minimum rate and closes the normally closed contacts FCS1 of the flow control switch. This condition continues, with the filtered liquid passing to filtrate receiver 28 and then out through filtrate discharge pump 29, until a sufficient cake accumulates on the flexible filter cloth to reduce the rate of flow of filtered liquid below the previously mentioned predetermined minimum. When that occurs, contacts FSC1 of the flow control switch are opened and relay coil R6 is deenergized thereby opening the contacts R6–3 to deenergize valve solenoid VS–2 and close feed valve V2. At the same time, normally closed contacts R6–4 are closed and valve solenoid VS–3 of by-pass valve V3 is energized to open the by-pass valve and permit recirculation of the slurry through the pump 12 which is continuously driven by the motor M1. Motor M1 is operated by contacts (not shown) of relay R2. Actuation of relay coil R6 also controls contacts R6–5 and R6–6 to operate indicator lights 43 and 44 to show the condition of the main valve.

When the coil R7 is energized, contacts R7–3 are closed, but at that time coil R6 is likewise energized and normally closed contacts R6–7 are opened. However, when the flow of filtered liquid falls below the predetermined minimum rate, flow control switch FCS is opened to deenergize relay coil R6, so normally closed contacts R6–7 are again closed. At the same time, liquid level switch LLS1 is closed, the liquid level being above the switch as shown in FIG. 1, so valve solenoid VS–4 is energized to open drain valve V4.

In addition to energization of solenoid VS–4, the closure of contact R6–7 energizes valve solenoid VS–5 to open purge air valve V5 and introduce air pressure into the pressure chamber to expedite the removal of the slurry from the pressure chamber. Since the pressure on the pressure chamber is substantially relieved, this air has little effect on the filter cake unless it is desired to dry the filter cake, in which case the flow of air may be continued after the slurry has been purged from the pressure chambers.

In this manner, while the slurry is still flowing into the filter heads and solids are being removed, the flow of slurry is cut off so the filter cake remains wet throughout the entire cake forming period of the cycle. At that point, the pressure is relieved in the pressure chamber on the inlet side of the filter head, the purge valve opened, and the slurry in the filter head is permitted to fall away from the cake. Drop of the slurry below the level of liquid level switch LLS1 discontinues the flow of air by opening contacts LLS–1 to deenergize drain valve solenoid VS–4 and close the valve V4 and deenergize the valve solenoid VS–5 to close the valve V5.

After the liquid level in the filter heads drops to the point that the liquid level switch LLS1 is actuated, normally closed contacts LLS1–2 are again closed to energize valve solenoid VS–6 through normally closed contacts R3–4 and the normally closed contacts LS2–1 of limit switch LS2 to shift valve V1 and supply air from supply pipe 35 through conduit 49 to the open end of air cylinder 25 to begin retraction of the piston rod 37, thereby operating the mechanism to open the filter heads. When the filter heads are sufficiently opened, stop 33 engages the striker arm of limit switch LS2 to open contacts LS2–1 and discontinue operation of the air cylinder by deenergizing the solenoid VS–6 of the two way air valve V1. When limit switch LS2 is thus actuated, contacts LS2–2 are closed and valve solenoid VS–7 is energized to open the valve V7 and break the vacuum applied to the discharge manifold 27. At the same time, valve solenoid VS–8 is also energized to supply air to air motor 24 and begin rotation of the filter cloths 19. This continues until another stop 34 on the filter cloth actuates the striker arm of limit switch LS3 to close contacts LS3–1 and energize relay coil R3 which opens the normally closed contacts R3–3, R3–4, and R3–5 to deenergize the valve solenoids VS–7 and VS–8.

In this way, the cycle is repeated with the controls first closing the filter heads and opening the main valve when the filter heads are closed to again supply slurry to the filter heads. Any filter cake which is formed on the flexible filter cloth is discharged during the brief time necessary to shift the filter cloth to a new position.

Flowrator 50 is a visual flow measuring device used to determine the optimum setting of flow control switch FCS. A scale on the flowrator is calibrated in terms of the percentage of the maximum flow for the unit. Test runs are then made to determine by visual observation of the flowrator scale at what percentage of the rated flow the efficiency of the filtering system begins to fall off. Then, the flow switch FCS is manually adjusted to operate when the pressure in manifold 13 corresponds to a rate of flow from vacuum chamber 18 above that at which the efficiency of the filtering system begins to diminish. After the flowrator 50 has been used to set flow control switch FCS, the flowrator may be by-passed by opening V11 and closing valve V12.

This automatic cycling of the filtering system utilizes the most efficient period of formation of the filter cake, and the arrangement for automatic cake discharge reduces to a minimum the shut-down time for cleaning the filter element. In addition, control of the cycling to clean the filter element when flow of the filtered liquid falls below a predetermined minimum rate compensates for most of the variable factors that affect the filtering operation. By controlling the cycle to maintain the rate of filtration above a certain minimum, rather than maintaining a particular pressure on the slurry, this system maintains a maximum pressure drop across the filter medium and takes into account variations in the cake resistance due to the compressibility factor of the solids forming the cake, the thickness of the cake, the particle size of the solids, the density of the solids in the slurry, and even the migration of fines into the interstices of the filter element. By reducing the shut-down time to a minimum, little time is lost by frequent cleaning of the filter elements so it is possible to operate within the most efficient portion of the filtrate flow curve of any slurry and thereby greatly increase the capacity of the filter per unit area of filter medium as compared to any filter system heretofore available.

This rapid cleaning of the filter medium is accomplished primarily through the construction and automatic operation of the filter heads. As shown in FIG. 3 these filter heads may be arranged in pairs on a framework 52 supported on a base 53 and carrying a pair of endless filter cloths 54 and 55, respectively supported on a pair of vertically spaced rollers 56, 57, and 58, 59. These rollers are rotatably mounted on axles which are carried by portions of the framework 52, and the lower rollers 57 and 59 may be driven by air motor 24 through worms 61 and 62 on a shaft 63 and engaging worm wheels 64 and 65 to respectively drive the rollers 57 and 59. Upper rollers 56 and 58 are driven synchronously with the lower rollers 57 and 59 by chains 66 and 67 driven by sprockets keyed to the lower shafts 68 and 69 and driving sprockets keyed to the upper shafts 71 and 72.

Each filter head has two parts. As best seen in FIG. 6, these parts are arranged on opposite sides of one run of the filter cloth 54 to define a chamber in which the filtration is effected. In the form shown, the parts are rectangular in shape, and a discharge or vacuum chamber 75 constitutes one part which is fixed to bracket 76 and 77 of the framework. Arranged within this discharge chamber may be any number of filter plates 78, 78, four being shown in FIG. 7. Each of these plates has its base 79 against the back wall of the discharge chamber with a plurality of ribs 81, 81 extending outwardly from the back wall to engage and support the filter cloth spaced from the base 79. These ribs 81, 81 are so arranged as to direct in substantially uniform fashion flow of filtered liquid from any part of the filter plates to a discharge passage 82 at the base of each plate. Each discharge passage 82 communicates with a discharge port or conduit 83 in the back wall of the discharge chamber 75 and each of the discharge conduits 83 is connected to a discharge manifold 85 which is in turn connected to the discharge pipes 26 and 27 shown in FIG. 1.

On the opposite side of one run of the filter cloth 54 is movably supported a second part of the filter head in the form of an inlet chamber 91. A plurality of brackets 92, 92 extend outwardly from the framework of the filter and each bracket carries a roller 93 supporting a rod 94 extending outwardly from the main wall 95 of the inlet chamber 91. Inlet chamber 91 is of rectangular shape having its marginal walls coincident with the marginal walls of the discharge chamber so the two chambers or two parts of the filter head may be clamped together on opposite sides of the filter cloth 54 and thereby form a pressure type chamber with the filter cloth disposed between the two parts of the filter. To improve the seal around the marginal edges of the two parts of the filter against the filter cloth, a gasket 96 may be carried around the exposed marginal edge of the inlet chamber.

A second filter head is likewise carried by the framework 52 and may include a movable inlet chamber 101 and a fixed outlet chamber 102 disposed on opposite sides of one run of the filter cloth 55. Movable inlet chamber 101 is supported in the same manner as just described with respect to chamber 91. Simultaneous movement of the two chambers may be effected by the air cylinder 25 on the piston rod of which is carried a rack 37 engaging a spur 105 to drive through a worm wheel and worm 106, 107 and thereby rotate a shaft 108 having a pair of reversely threaded portions 109 and 111. Nuts 112 and 113 on the reversely threaded portions are pivotally connected at 114 and 115, respectively, to levers 116 and 117, the other ends of which are respectively pivoted at 118 and 119 to the inlet chambers 91 and 101 as best shown in FIG. 5. Intermediate their ends, levers 116 and 117 are pivoted at 121 and 122 to brackets 123 and 124 carried by the framework 52. The threads are so arranged that retraction of the piston in cylinder 25 moves the rack 37 in a direction to rotate the shaft 108 to move the nuts 112 and 113 toward each other and thereby move the inlet chambers 91 and 101 away from each other and away from their respective filter cloths to open the filter heads and permit shifting movement of the filter cloths. In order that the filter cloths will always be engaged at the same points by closure of the filter heads, each filter cloth is provided with a pair of stops 125, 125 on its surface, for engaging the striker of limit switch LS3 to stop rotation of the cloth as already described.

Transfer of slurry into the filter head is effected through conduit 127 which may be connected to the conduit 17 shown in FIG. 1. On both sides of the filter head, conduit 127 is connected to the bottom of the inlet chamber. For the purpose of expediting the removal of slurry from the chamber, and also in some instances for controlled drying of the filter cake, the air may be introduced into the inlet chamber through a conduit 128 at the top of the chamber. This conduit 128 is connected through air control valve V5 to the air supply pipe 35 as shown in FIG. 1.

In accordance with the control system heretofore described, the two parts of the filter head are closed against opposite sides of one run of the filter cloth and the slurry is introduced through the inlet passage of conduit 127 into the inlet chamber from which point it passes through the filter cloth to the discharge or vacuum chamber and out through the discharge conduits 83. When the flow of filtered liquid is reduced to a certain rate by the accumulation of a cake on the filter cloth, the flow of the slurry is cut off and the filter chambers are emptied. Then, air cylinder 25 is actuated to open the chambers and air motor 24 turns the filter cloths so the filter cake accumulated on one run is moved downwardly and a clean section of the filter cloth is moved into place between the two parts of the filter, movement of the filter cloth being arrested when the next stop 125 engages the striker of limit switch LS3. Filter cake discharged from the filter cloths is accumulated on a conveyer 131 which is supported on the base 53 and which may be in the form of an endless belt carried by rollers such as the roller 132 to be driven by the air motor 133 shown in FIG. 1.

Any desired capacity of the filter system may be attained by arranging a plurality of filter heads in a bank so they are operated simultaneously to effectively form a single filter element in the system.

One arrangement of a plurality of filter heads is shown in FIG. 8. There shown, the filter heads are combined in pairs much the same as the pair heretofore described in connection with FIGS. 2–7, inclusive. One part of the two part head is stationary, being supported on the framework of the filter. As shown in FIG. 8, the discharge chamber 201 is supported by a frame 202 secured in fixed position on four longitudinally extending rods 203, 203. These rods are supported in end members 204, 205 and by intermediate standards 206, 206. Rollers for each of the endless flexible cloths 207, 207 are likewise carried by the frame 202. Movement of the filter cloths is effected by air motor 24 which drives shaft 208 to rotate the several worms 209 and thereby drive the worm wheels 210 to turn the lower rollers and drive chains 211 to turn the upper rollers.

Movably supported by shoes 213, 213 slidable on the rod 203, is an inlet chamber 214 for each filter head. Operation of air cylinder 25 is effective through rack 37 to rotate shaft 215 having several reversely threaded portions 216 on which are threaded nuts 217, 217. A plurality of levers 218 are pivotally mounted on shafts 219 extending transversely of the filter and supported by brackets 221 on the upper rods 203. One end of each of the levers 218 is pivotally connected to one of the nuts 216 and the other end is pivotally connected at 222 to the respective inlet chambers 214 of the filter heads.

When the filter heads are closed, slurry is supplied through inlet passages 223 to the inlet chambers 214 through the filter cloths 207, and filter liquid is discharged through outlet passages 224. To support the filter cloth within the vacuum or discharge chambers 201, filter plates may be arranged in the same manner as described with respect to the single filter head and as shown in particular in FIG. 7. When the flow of liquid in the outlet passages 224 is reduced to a predetermined rate, the flow of slurry is discontinued and the filter heads are drained, the drainage being assisted, if desired, by air introduced through air ports 225, 225 at the tops of the inlet chambers. When the two chambers of the filter heads have been cleared, air cylinder 25 is actuated to simultaneously move all of the inlet chambers away from the filter cloths and air motor 24 is then operated to shift the filter cloths until a projection 125 on one of them engages limit switch LS3 so a clean area of the filter cloths is positioned between the separable elements. Cake discharged from the filter cloths is deposited on an endless conveyer 231 which may then be driven by the air motor 133 to remove the filtered solids. Actuation of limit switch LS3 initiates a cycle to operate air cylinder 25 and thereby close the inlet or pressure chambers against the filter cloths so the cycle of operation may be repeated.

As already described, filter heads utilizing endless filter cloths require a minimum shut-dow time for purposes of removing the accumulated solids so the filter may be periodically shut down at relatively short intervals to utilize the period of maximum efficiency of the filters. In the system shown, the incoming slurry is cut off when the flow of the filtered liquid is reduced to a predetermined point. This arrangement compensates for most of the factors which affect the efficiency of the filtration system and which have heretofore rendered filters so inefficient. In addition to the advantage of the system from the standpoint of high efficiency and low shut-down time, the filter heads are of relatively simple construction affording a very flexible system according to the capacity necessary; also the filter heads in the system may easily be maintained and a minimum of stand-by equipment is required.

It is recognized that many different types of filter heads may be employed in the filtration system and that many variations may be made in the construction of the filter heads. It is, therefore, intended that the foregoing description and the accompanying drawings be considered as illustrative and not in a limiting sense, the invention being defined in the appended claims.

What is claimed is:

1. A pressure filtering system comprising a filter head having inlet and outlet passages, a filter element within said head between said passages to filter solids from a slurry passing through said head, means for supplying a slurry under pressure to said inlet passage, a valve in said inlet passage for controlling the flow of slurry to said filter element, filter head operating means for opening said head to expose said filter element for cleaning and control means for periodically closing said valve to discontinue flow of the slurry to said element, actuating said operating means to open and close said head, and then opening said valve.

2. A pressure filtering system comprising a filter head having inlet and outlet passages, a filter element within said head between said passages to filter solids from a slurry passing through said head, means for supplying a slurry under pressure to said inlet passage, a valve in said inlet passage, filter head operating means for opening said head to expose said filter element for cleaning, cleaning means for removing solids from said filter element, and control means for periodically closing said valve to discontinue flow of the slurry to said element, actuating said operating means to open said head, actuating said cleaning means, actuating said operating means to close said head, and then opening said valve.

3. A pressure filtering system comprising a filter head having inlet and outlet passages, a filter element within said head between said passages to filter solids from a slurry passing through said head, a drain connected to said head on the inlet side of said element, means for supplying the slurry under pressure to said inlet passage, vacuum means connected to said outlet passage, valves in said inlet and outlet passages and said drain, filter head operating means for opening said head to expose said filter element for cleaning, and control means for periodically closing said valves in said passages and opening the valve in said drain, and subsequently actuating said operating means to open said head.

4. A pressure filtering system comprising a filter head having inlet and outlet passages, a filter element within said head between said passages to filter solids from a slurry passing through said head, means for supplying a slurry under pressure to said inlet passage, cleaning means for removing solids from said filter, a valve in said inlet passage, filter head operating means for opening said head to expose said filter element for cleaning, and control means for sequentially actuating said operating means to close said head, opening said valve to supply the slurry to said head, closing said valve to arrest flow of the slurry to said head, actuating said operating means to open said head, and actuating said cleaning means to remove the solids from said filter element while said head is open.

5. A pressure filtering system comprising a filter head having inlet and outlet passages, an endless filter element having one run within said head between said passages to filter solids from a slurry passing through said head, means for supplying a slurry under pressure to said inlet passage, a valve in said inlet passage, filter head operating means for opening said head to release said filter element for cleaning, and control means for periodically closing said valve to discontinue flow of slurry to said element and actuating said operating means to open said head and permit shifting of said endless filter element, closing said head, and then opening said valve to repeat a filtering cycle.

6. A pressure filtering system comprising a filter head having inlet and outlet passages, an endless filter element having one run within said head between said passages to filter solids from a slurry passing through said head, means for supplying a slurry under pressure to said inlet passage, a valve in said inlet passage, filter head operating means for opening said head to release said filter element, filter element shifting means operable when said head is open for moving said endless filter element to position different areas between said passages, and control means for sequentially actuating said operating means to close said head, opening said valve to supply the slurry to said head, closing said valve to arrest flow of the slurry to said head, actuating said operating means to open said head, and actuating said shifting means to change the position of said filter element within said head.

7. A pressure filtering system comprising a filter head having inlet and outlet passages, a filter element within said head between said passages to filter solids from a slurry passing through said head, a valve in said inlet passage, filter head operating means for opening said head to expose said filter element for cleaning and for closing said head to contain said filter element, and control means responsive to a reduction in the flow of liquid from said filter element for closing said valve, actuating said operating means to open and close said head, and then opening said valve.

8. A pressure filtering system comprising a filter head having inlet and outlet passages, a filter element within said head between said passages to filter solids from a slurry passing through said head, a valve in said inlet passage, filter head operating means for opening said head to expose said filter element for cleaning and for closing said head to contain said filter element, cleaning means operable when said head is open for removing solids from said filter element, and control means responsive to a reduction in the flow of liquid through said filter for sequentially actuating said operating means to close said head, opening said valve, closing said valve, actuating said operating means to open said head, and actuating said cleaning means to remove solids from said filter element.

9. A filter comprising a filter head having inlet and outlet compartments, an endless filter element having a run between said compartments, means for moving said element, and means controlled by a stop on said element for arresting said moving means to position different areas of said element between said compartments.

10. Filtration apparatus comprising a frame, a plurality of filter heads carried by said frame, each of said filter heads including a filter element with relatively shiftable filter parts on opposite sides of the element, means for simultaneously relatively shifting the parts of each filter head to clamp and release the respective filter elements, and means operated after shifting of said parts to release said elements for moving all said elements to position different portions thereof between the parts of the respective filter heads.

11. Filtration apparatus comprising a frame, a plurality of filter heads carried by said frame, each of said filter heads including a flexible endless filter element with relatively shiftable filter parts on opposite sides of one run of the endless element, means for simultaneously relatively shifting the parts of each filter head to clamp and release respective filter elements, and means operated after shifting said parts to release said element for simultaneously moving the filter elements to position different areas between the filter parts of the respective filter heads.

12. Filtration apparatus comprising a frame, a plurality of filter heads carried by said frame, each of said filter heads including an endless flexible filter element with relatively shiftable filter parts on opposite sides of one run of the element, means for simultaneously relatively shifting parts of each filter head to clamp and release the filter element between said parts, means for simultaneously moving the endless flexible filter element to position different areas thereof between the parts of the respective filter heads, and control means periodically operable to actuate said shifting means to open the parts of the filter head, actuate said moving means to move clean areas of the flexible filter elements into position between the filter parts, and then actuating said shifting means to close the filter parts and clamp the same against opposite sides of the respective filter elements.

13. A pressure filtering system comprising a filter head having inlet and outlet chambers on opposite sides of a filter element, means for supplying a slurry under pressure to said inlet chamber, a normally closed drain connected to said inlet chamber, means connected to said inlet chamber for supplying fluid under pressure to the inlet side of said filter element, control means responsive to a condition in one of said chambers for opening said drain, and means operated by said control means for causing fluid under pressure to be introduced into said inlet chamber to remove slurry from said inlet chamber and permit removal of solids from said filter element.

References Cited in the file of this patent

UNITED STATES PATENTS

| 482,777 | Avery | Sept. 30, 1892 |
| 920,909 | Brewer | May 11, 1909 |
| 1,119,736 | Wagner | Dec. 1, 1914 |
| 1,241,525 | Leatherbee | Oct. 2, 1917 |
| 1,759,636 | Turner | May 20, 1930 |
| 1,767,318 | Shaw | June 24, 1930 |
| 1,778,342 | Thompson | Oct. 14, 1930 |
| 1,987,142 | Clements | Jan. 8, 1935 |
| 2,072,942 | Carver | Mar. 9, 1937 |
| 2,178,416 | Bausman | Oct. 31, 1939 |
| 2,210,213 | Long | Aug. 6, 1940 |
| 2,296,486 | Zahn | Sept. 22, 1942 |
| 2,303,262 | Dunmire | Nov. 24, 1942 |
| 2,366,903 | Harms et al. | Jan. 9, 1945 |
| 2,451,029 | Hughes | Oct. 12, 1948 |
| 2,557,724 | Burks | June 19, 1951 |
| 2,569,748 | De Grave | Oct. 2, 1951 |
| 2,679,936 | Bench | June 1, 1956 |
| 2,867,325 | Hirs | Jan. 6, 1959 |
| 2,867,326 | Hirs | Jan. 6, 1959 |

FOREIGN PATENTS

| 128,569 | Austria | June 10, 1932 |
| 580,013 | Great Britain | Aug. 23, 1946 |